United States Patent
Kaldewey et al.

(10) Patent No.: US 7,587,274 B2
(45) Date of Patent: Sep. 8, 2009

(54) SYSTEM AND METHOD FOR NAVIGATING A FACILITY

(75) Inventors: Tim Kaldewey, Ennigerloh (DE); Samir Raiyani, Sunnyvale, CA (US); Robert Pei, Richmond, CA (US); Sneschana Sobol, Ettlingen (DE)

(73) Assignee: SAP AG, Walldorf (DE)

( * ) Notice: Subject to any disclaimer, the term of this patent is extended or adjusted under 35 U.S.C. 154(b) by 486 days.

(21) Appl. No.: 11/375,374

(22) Filed: Mar. 14, 2006

(65) Prior Publication Data

US 2007/0219711 A1 Sep. 20, 2007

(51) Int. Cl.
*G08B 29/00* (2006.01)

(52) U.S. Cl. .................................. 701/208; 340/995.1

(58) Field of Classification Search ......... 701/208–211, 701/206, 218, 210; 340/995.1, 990, 988, 340/995.28, 286.14, 539.2
See application file for complete search history.

(56) References Cited

U.S. PATENT DOCUMENTS

| | | | |
|---|---|---|---|
| 7,259,656 B1 * | 8/2007 | Wright | 340/286.14 |
| 7,263,375 B2 * | 8/2007 | Zavada et al. | 455/456.6 |
| 7,382,271 B2 * | 6/2008 | McFarland | 340/686.6 |
| 7,408,839 B2 * | 8/2008 | McFarland | 367/124 |

OTHER PUBLICATIONS

Wikipedia, "Dijkstra's Algorithm", www.wikipedia.org (printed from the Internet Mar. 10, 2006).

* cited by examiner

*Primary Examiner*—Dalena Tran
(74) *Attorney, Agent, or Firm*—Brake Hughes Bellermann LLP

(57) ABSTRACT

Systems and methods are described for enabling the monitoring and navigation of a complex of known rooms or facilities having known objects, attributes and/or people associated therewith, wherein different locations of the objects, attributes and/or people within the facilities are related and accessible over known, well-defined alternate paths. Sensor information may be used to facilitate the monitoring and navigation of the facility. At least some systems and methods may be used to enable the navigation of a building or a set of buildings by displaying an interactive graphical map of the building on a display device carried by a user.

18 Claims, 14 Drawing Sheets

SYSTEM AND METHOD FOR NAVIGATING A FACILITY

TECHNICAL FIELD

This description relates to navigation of a facility.

BACKGROUND

Typically, maps may be available to navigate a building or a set of buildings. Such maps display the various rooms inside a building. They may also display some equipment inside a building. But typically, these maps have several limitations. For example, conventional maps that are static in nature may be used. However, such maps may be of little or no use to a doctor in a hospital building in identifying the closest vacant emergency room in an emergency situation.

SUMMARY

According to one general aspect, a system is described for enabling the monitoring and navigation of a facility including a plurality of identifiable spaces each associated with one of a plurality of exits, the spaces and exits being linked by a network of pathways, or for determining the position and travel history of tracked resources residing in one of the spaces or moving along the pathways. The system includes but is not limited to (a) a map database operable to store digital map data relating to the facility, (b) a position determination system operable to receive sensor information from at least one sensor, the sensor information identifying the various resources, spaces, and associated exits, the position determination system further operable to develop relational data identifying a relative position of each said resource, space, and exit within said facility, based on the sensor information and the map data, and (c) a location database operable to store said relational data in tables including space-identifying data, tracked-resource data, and exit-identifying data.

According to another general aspect, a method is described for finding the shortest path between a starting space and a destination space in a facility including a plurality of identifiable spaces each associated with one of a plurality of identifiable exits, the spaces and exits being linked by a network of pathways, and the facility having a database identifying within the facility each said identifiable space and the spatial co-ordinates of at least one exit associated with each said space. The method includes but is not limited to (a) selecting from said database a starting space and a destination space between which the shortest linking path is to be determined, (b) selecting the spatial co-ordinates for a first exit associated with the starting space and the spatial co-ordinates for a second exit associated with the destination space, (c) using a shortest path algorithm to calculate the lengths, in distance or time of travel, of a plurality of paths linking said first and second exits, and (d) determining the shortest overall path from the calculated plurality of paths.

According to another general aspect, a method is described for finding a tracked resource closest to a user within a facility including a plurality of identifiable spaces each associated with one of a plurality of identifiable exits, the spaces and exits being linked by a network of pathways, the tracked resource being identified by the user as having a pre-defined attribute, and the facility having a database identifying within the facility each said identifiable space and the spatial co-ordinates of at least one exit associated with each said space. The method includes but is not limited to (a) determining spatial co-ordinates of a first space occupied by said user, (b) determining spatial co-ordinates of a first exit associated with said first space, (c) identifying a particular type of tracked resource by receiving a specification of a pre-defined attribute thereof, (d) determining, within said facility, second through n spaces, where n is an integer, each of which is occupied by a tracked resource having said pre-defined attribute, (e) determining the spatial co-ordinates of second through n exits, each of which is associated with a corresponding one of said second through n spaces, (f) using a shortest path algorithm to calculate multiple sets of paths respectively linking said first exit and each of said second through n exits, (g) determining the shortest path in each said set of paths and (h) determining the shortest overall path among said shortest paths.

According to another general aspect, a method is described for determining and updating the traffic history of tracked resources moving over time among various spaces in a facility including a plurality of identifiable spaces each associated with one of a plurality of identifiable exits, the spaces and exits being linked by a network of pathways, the facility further including a database identifying within the facility each said identifiable space and the spatial co-ordinates of at least one exit associated with each said space and calculated shortest paths between all pairs of exits associated with the facility. The method includes but is not limited to (a) identifying a particular type of tracked resource by receiving a specification of a pre-defined attribute thereof, (b) determining spaces within said facility occupied by each said particular type of resource at successive points in time, (c) archiving the spatial co-ordinates of an exit associated with each said space occupied by one of said resources at each said point in time, (d) using the archived spatial co-ordinates of said exits to determine a potential path followed by each said resource, (e) determining pairs of adjacent exits associated with each said potential path by correlating the potential paths followed by each said resource with predetermined co-ordinates of adjacent exits within said facility, (f) calculating a parameter for each pair of adjacent exits through which at least one of said potential paths passes, and (g) using a shortest path algorithm based on the calculated parameter to calculate the shortest paths between at least some pairs of exits associated with the facility.

Further, example embodiments may include, among various other features and uses, (a) a means for identifying and displaying various buildings, rooms, and associated exits inside a facility, (b) a means for identifying and displaying the various devices or objects of interest inside the facility, (c) a means for identifying and displaying the various people inside the facility with whom the user wishes to establish contact, or whom he might wish to visit, and (d) a means for interactively identifying the shortest way to reach the room or the location of the device, objects, or people inside the facility. Such means could include, for example, kiosks, placed at a facility, displaying the one or more buildings in the facility, where the display can be queried by a user to identify a person of interest in the facility.

For example, in a hospital, such a means could include a computing device like a laptop with a display, displaying an interactive graphical map of a hospital. The interactive graphical map displayed by such means, may display various rooms, people and assets inside the hospital. In the said means, the interactive graphical map may be updated periodically, such that any change in the location of assets and people over time is tracked. Using such means, for example, a doctor of the hospital may query the displayed map to locate the shortest path to a vacant operation theatre during an emergency.

Accordingly, for example, navigation of a facility with known attributes, objects, rooms, people, or buildings may be enabled, e.g., by displaying an interactive graphical map of the facility on a display device carried by the user. Objects of interest and people inside a facility may be displayed on an interactive graphical map of the facility, and the shortest path between two points in the facility may be identified and displayed, where the two points may include, for example, exit co-ordinates of rooms identified by a user. Similarly, the closest person or object of interest inside a facility may be identified and displayed, where the person or object of interest may be specified by the user, for example, on the basis of their pre-defined attributes (such as a person's role in the organization, e.g. nurse) stored in a database. The shortest path to the building or a room inside a facility where the objects (or people) of interest are located may be identified and displayed, where the objects (or people) of interest may be specified by a user. The room may be chosen by a user from a interactive graphical map that displays the various rooms of the facility, and/or may be specified by a user on the basis of room attributes stored in a database.

The details of one or more implementations are set forth in the accompanying drawings and the description below. Other features will be apparent from the description and drawings, and from the claims.

BRIEF DESCRIPTION OF THE DRAWINGS

FIG. 4c is a screenshot that displays the shortest path between a starting room and a destination room of the facility shown in FIG. 4b, according to the method described in FIG. 4a;

FIG. 6b is a screenshot displaying the shortest path between a user and a tracked resource identified by the user per the method described in FIG. 6a;

DETAILED DESCRIPTION

Figure 1:
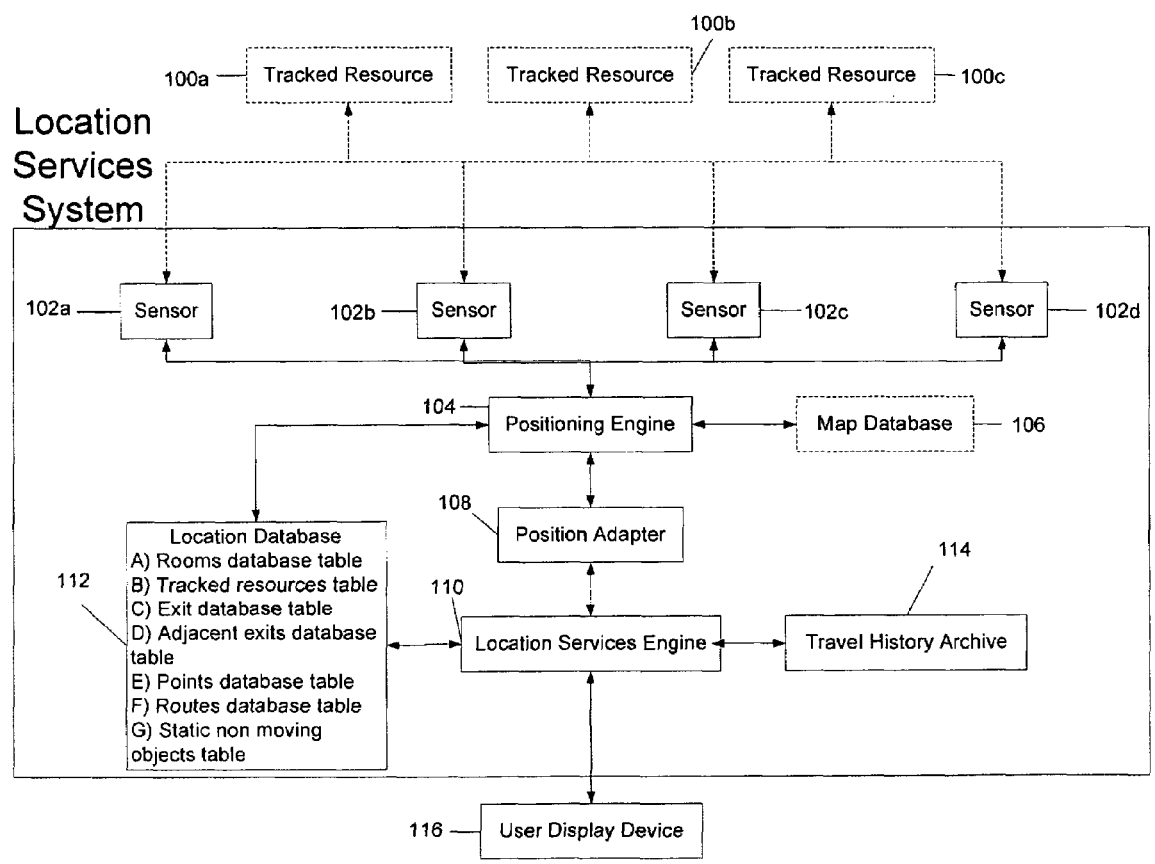
FIG. 1 is a block diagram of a location services system according to an example implementation.

In some example implementations, systems and methods are described for enabling the navigation of a facility of known buildings and spaces (and/or facilities having known objects, attributes and/or people associated therewith), wherein different locations of the objects, attributes and/or people within the facilities may be related and accessible over alternate paths.

DEFINITIONS

All definitions included here are to be understood as examples. The defined element(s) need not necessarily include all of the features described in the definition(s), and may include additional or alternative features, as well.

Sensor: Sensors may include devices that gather data from the environment around them. They may convert this data into signals and transmit them to other devices such as computers (for example, via a wired or wireless network). The signals may then be transformed by computer processors into corresponding information. In one example embodiment, location sensors associated with users and objects (both stationary and mobile) transmit location signals that enable the tracking of users and objects, respectively. The location sensors may be associated with the mobile systems carried by a user. The location sensors may be either already extant at a site (e.g. embedded in the walls or other services of a facility), or, in other example embodiments, may be introduced by users themselves.

Tracked resource: A tracked resource may include, for example, a person, a piece of equipment or any other moving or non-moving object that has a sensor associated with it, which can transmit location signals for tracking by a positioning engine. For example, sensors may be associated with mobile systems carried by users. Associated with each tracked resource are various attributes. One example of an attribute is the unique identifier of the tracked resource. The unique identifier identifies the tracked resource uniquely. The tracked resources may have other attributes associated with them based on their current conditions. These attributes may change over time. One such attribute is the current location of a tracked resource.

Co-ordinates or Cartesian co-ordinates: These are the unique geographic location co-ordinates of a point in physical space. Co-ordinates may be expressed with respect to an absolute reference frame (e.g., the earth), or with respect to a relative reference frame (e.g., within a building, or within/across a group of buildings).

Positioning engine: A positioning engine may include a computer program that determines the co-ordinates of tracked resources. The positioning engine receives location signals from sensors associated with tracked resources. It interprets the location signals and assigns co-ordinates to the tracked resources. It also associates time stamps (the time at which the location signals are received by the positioning engine) with the determined co-ordinates. The positioning engine may, in some examples, correlate the tracked resource co-ordinates to the room co-ordinates (described below), stored in a room database table, and determines the room a tracked resource is located in. The positioning engine updates the co-ordinates of tracked resources at regular time intervals. By comparing the time stamps of co-ordinates over a time interval, the positioning engine detects changes in geographical location of tracked resources. The positioning engine records the tracked resources co-ordinates with the associated time stamps in a travel history database or archive.

Position adapter: The position adapter receives the unique identifier and the co-ordinates of the tracked resource from the positioning engine and translates them into a format readable by the location services engine.

Facility: A facility may include a physical space with a complex of known buildings, and spaces such as rooms, having known objects, attributes and/or people associated therewith, wherein different locations of the objects, attributes and/or people within the facilities may be related and accessible over (e.g., known, well-defined) alternate paths. The facility may be, for example, a physical space with one building or may be a physical space which has a set of buildings with areas between buildings.

Mapped space: The mapped space may be a physical space like a facility, for which architectural drawings are available in a digital form. Such drawings, for example, may be in formats like JPEG images or CAD (Computer Aided Design system) drawings.

Room: A room may include a bounded physical space, inside a facility, having one or more entrances/exits. Each room may be identified by a unique room identifier, where the identifier may be assigned automatically or manually. Associated with rooms may be further attributes like a name and parameters like temperature or co-ordinates. In one example embodiment, the co-ordinates of each of the corners of the room are determined manually from the drawing of the mapped space and stored in a database. Since a room may include a bounded physical space, rooms also may be referred to as space(s).

Exit: An exit is the place where entry to or exit from a room is possible. The exit co-ordinates may be defined as the mid point of the entry or exit to a room. In one example embodiment, the exits are determined manually from the mapped space drawing. Once the exits are determined, their respective co-ordinates are also determined manually from the mapped space drawing. Of course, some rooms may have separate entrances and exits, e.g., to control a flow of persons into/out of the room(s). Therefore, the term exit should be understood to include, for example, any opening in a room that allows exit from (or entrance to) the room.

Adjacent exits: A pair of exits is adjacent to each other if they can be reached without traversing an intermediate exit. Adjacent exits may be determined manually from the mapped space drawing.

Distance between adjacent exits: The distance between adjacent exits may be measured as the Euclidean distance between the exit co-ordinates of adjacent exits.

Shortest path between adjacent exits: The line connecting the mid point of adjacent exits is the shortest path connecting them. Of course, the term shortest path should be understood to reference the shortest path available for human or vehicle travel (e.g., not including paths through walls or other path-blocking obstructions), and therefore takes into account any natural choices or variations that may occur during (and due to) human motion or vehicle motion (e.g., not moving in exactly a straight line, or having to navigate around obstructions). For example, a path may be defined from one exit to another that requires rounding a corner. In this case, a shortest path may be defined as being adjacent to the walls defining the corner, when normally a person also may walk down a middle of a hallway(s) that include the walls.

Non-adjacent exits: A pair of exits is non-adjacent if they can be reached only by traversing other intermediate exits.

Dijkstra's algorithm: Dijkstra's algorithm, named after its inventor, Dutch computer scientist Edsger Dijkstra, is an algorithm that solves the single-source shortest path problem for a directed graph with non-negative edge weights. For example, if the vertices of the graph represent room exits and the edge weights of the graph represent distances between pairs of adjacent exits connected by a direct line, Dijkstra's algorithm can be used to find the shortest path between any two exits. In this case the shortest path calculated is the path joining the two exits with the least overall distance.

In another example, if the vertices of the graph represent room exits and edge weights represent time taken to travel between adjacent exits, the Dijkstras algorithm may be used to calculate the shortest path between any two exits. In this example, where the edge weight is time of travel between adjacent exits, the shortest path calculated is the path joining the two exits taking the least overall time to travel.

Example description of Dijkstra's algorithm for the purpose of this description: A graph G may be constructed manually from the digital map of a facility that comprises a set of buildings. Each exit of a facility may be represented as a vertex on graph G. V may be defined as the set of all vertices in graph G. Lines joining adjacent exits of a facility may be represented as edges of graph G. Each edge of the graph is an ordered pair of vertices (u,v) representing a connection from vertex u to vertex v. The set of all edges of graph is denoted herein as E.

In one example embodiment, the edge weights of the graph are the distances between the adjacent exits of a facility. Weights of edges are given by a weight function: $w: E \rightarrow [0, \infty]$; therefore $w(u,v)$ is the cost of travel from vertex u to vertex v.

The input to Dijkstra's algorithm is the weighted directed graph G as described above, and a source vertex 's' in G. For a given pair of vertices s and t in V, the algorithm finds the path from s to t with lowest cost, which means a path with the lowest total sum of edge weights. This is the path with the least distance. Dijkstra's algorithm can also be used for finding the shortest paths from a single vertex s to all other vertices in the graph.

Access level: The access level is associated with a tracked resource and a room. It indicates whether the tracked resource is allowed access to a room or not, or may indicate a level or extent of allowed access.

In the following description, numerous specific embodiments are set forth in order to provide a thorough understanding. However, as will be apparent to those skilled in the art, such specific details need not be used, and additional or alternate elements or processes may be used. In other instances, well known processes, procedures, components, and circuits may not be described in detail so as not to unnecessarily obscure aspects of the present description.

Location Services System

FIG. 1 illustrates the location services system in accordance with an example embodiment. The location services system includes a location services engine 110, a positioning engine 104, a position adapter 108, a location database 112 and a travel history archive 114. It further includes sensors 102a-102d that can collect location data for the tracked resources 100a-100c. The sensors can be connected wirelessly or through a wired connection to the positioning engine 104, where the software on the sensors 102a-102d transmits data to the positioning engine. The user has a display device 116 to interact with the location services engine and to display the output from the location services engine.

The sensors 102a-102d can be location sensors. Location sensors gather location data and transmit them as signals to the positioning engine 104. Also, embedded with the signal may be the unique identifier (tracked resource identifier) that associates the signal to the tracked resource. Each sensor 102 has embedded software that can transmit data as signals to the positioning engine 104.

Location Services System: Positioning Engine

The positioning engine 104 may include at least two components: (1) a location receiver to receive signals from the sensors, and (2) an interpreter or processor to transform received signals into co-ordinates.

The positioning engine 104 can be used for both indoor and outdoor tracking. For example, a variety of positioning engines 104 for indoor tracking can be used in this system. These may include systems that use radio signals for location tracking using radio protocols such as IEEE802.11b, Bluetooth, or Zigbee. The positioning techniques used by these engines may include proprietary techniques based on the signal strength or time information of the radio signals. Furthermore, the radio signals mentioned above may be exchanged between tracked devices or between tracked devices and so-called beacons, which are pre-installed radio frequency transceivers. In another embodiment, a positioning engine 104 may use a combination of motion sensing with infrared or other communication techniques for identifying the co-ordinates of tracked resources. For outdoor tracking, a positioning engine 104 may use Global Positioning System (GPS) technology. Also, a hybrid of positioning techniques mentioned above may be used, e.g., for improved accuracy. The positioning engine 104 can integrate information from both outdoor and indoor positioning engines to determine the co-ordinates of tracked resources.

The positioning engine 104 may include a client and a server software component. In such example embodiments, the client software component resides on the sensor 102, associated with tracked resource 100, and communicates signal strength or timing information over a wireless connection to the server software component that resides on a computer server. The server software component determines the co-ordinates of tracked resources from the sensor signal.

The positioning engine 104 receives the location signals from location sensors 102a-102d associated with tracked resources. The positioning engine 104 interprets the location signals from location sensors 102a-102d and converts them into location co-ordinates. The positioning engine 104 also time stamps the location co-ordinates.

The positioning engine 104 correlates the location co-ordinates of each tracked resource 100a-100c with the co-ordinate information for rooms stored in the map database 106. It thus determines the identity of the room (identified from the room identifiers) a tracked resource is currently in.

The positioning engine 104 periodically communicates the following information as a message to the position adaptor 108: (a) the unique tracked resource identifier of the tracked resource 100a-100c, (b) the location co-ordinates of the tracked resource 100a-100c, (c) the room the tracked resource 100a-100c is in, and (c) the time stamp associated with the determined location co-ordinates The positioning engine 104 communicates the co-ordinates information to the position adapter 108. This message can be communicated as eXtensible Markup Language (XML) messages sent over a HyperText Transfer Protocol (HTTP) connection. The position adapter 108 translates the messages received from the positioning engine 104 into a format understood by the location services engine 110.

Location Services System: Position Adapter

The position adapter 108 transforms the information it receives from the positioning engine into a format understandable by the location services engine 110.

Thus, the location services system of FIG. 1 may be understood to include a position determination system that including, in the present example, the illustrated positioning engine 104 and the position adaptor 108. Of course, these are merely examples, and, for example, functionalities of the position adaptor 108 may be integrated with the position engine 104, or, in other example implementations, various functions of the position engine 104 may be split or distributed into a corresponding plurality of components.

Location Services System: Map Database

The positioning engine 104 is connected to the map database 106. The map database 106 may be a software database of maps and images stored in a digital format. The map database 106 may include, for example, a relational database that stores large amounts of information regarding coordinates of various points/locations of interest on the map. In one embodiment, the map database stores co-ordinates of rooms and room exits inside a facility.

The positioning engine 104 uses the map database and the location information obtained from the sensors to identify the room each tracked resource is in.

Location Services System: Travel History Archive

The positioning engine 104 communicates the time stamped co-ordinates of tracked resources and the room they are located in, via the position adapter 108, to the location services engine 110. The location services engine archives this information in a travel history archive 114. The archive may be queried by the location services engine for the travel history of a tracked resource.

In one example embodiment, the travel history archive 114 may include a database that stores the co-ordinates of tracked resources and the rooms they are located in. In another example embodiment, the travel history archive 114 may include a data structure in the computer memory that stores time stamped co-ordinates of tracked resources and the rooms they are located in.

Location Services System: Location Services Engine

The location services engine 110 may include a component that receives and responds to information requests from user devices. In one embodiment, the location services engine 110 can run on a platform such as SAP NetWeaver, which includes a web server and an application server that communicates to the user's display devices using the Hypertext Transfer Protocol ("HTTP").

In one embodiment, the location services engine 110 can send Scalable Vector Graphics (SVG) documents to the user's display device in response to HTTP requests from the user's display device. The location services engine 110 may also use an "HTTP-push" mechanism, wherein the SVG documents are sent as messages to the client from the server without the client explicitly requesting such information. The SVG document may consist of maps and interactive functions to help navigate the maps.

SVG documents are documents written in XML to present two-dimensional static or animated graphical information on the Internet.

The location services engine 110 periodically receives the following information from the position adapter 108 (a) the unique tracked resource identifier of the tracked resource 100a-100c, (b) the location co-ordinates of the tracked resource 100a-100c, (c) the room the tracked resource 100a-100c is in, and (c) the time stamp associated with the determined location co-ordinates.

The location services engine 110 provides, for example, at least the following services to the user device 118: (a) identifying and displaying the shortest path between two room exits (b) identifying and displaying the closest (or farthest) object(s) of interest or person of interest to the user (c) providing intrusion alerts for restricted rooms and (d) querying the travel history archive on behalf of the user to obtain travel history of tracked resources of interest.

Each of these services is provided by a subcomponent of the location services engine. These subcomponents, in one embodiment are software, though of course, any one of them can also be dedicated hardware components installed for speed or efficiency.

Location Services System: Location Database

The location database 112 may be connected bi-directionally to the positioning engine 104 and/or to the location services engine 110. In the example of FIG. 1, the location database 112 stores information in the form of database tables. Each database table contains rows and columns—each column representing a data field and each row containing a data record. The data stored in the database tables may be numeric type, alphanumeric type, decimal and images. The following database tables are examples of database tables that may be stored in the location database 112:

(a) The rooms database table (PSE_ROOMS) stores information about rooms. It contains, in one example embodiment, at least the following data fields: Space_ID—unique identifier for a room; and Name—name of room.

(b) The tracked resources table (PSE_TRACKED RESOURCE) contains information about tracked resources. It contains, in one example embodiment, at least the following data fields: ID—a unique identifier; Name—the name of the tracked resource; X, Y and Z—the X, Y and Z co-ordinates of the tracked resources, respectively; Area_ID—the identifier for the room the tracked resource currently is located in; Access_level—the pre-defined access levels for the tracked resources associated with the room a tracked resource is currently located in; Last_update—the time stamp information associated with the last time the tracked resources information was recorded by the positioning engine; and Description—the user defined description of the tracked resource.

(c) Exit database table (PSE_EXITS): stores the rooms associated with each of the exits. It contains, in one example embodiment, at least the following data fields: ID—unique identifier; X, Y and Z—X, Y and Z co-ordinates of exit point; Name—name of exit; From_Loc_ID—entry room identifier; To_Loc_ID—exit room identifier; and Blocked—indicator to record if the exit is blocked.

(d) Adjacent exits database table (PSE_PATH): stores adjacent exit details and distance between them. It contains, in one example embodiment, at least the following data fields: D—unique identifier; From_Exit—starting exit; To_Exit—end exit; Distance—distance between adjacent exits; Path_X—X coordinates of the intermediate points within a path between starting and end exit (e.g., each field may have a series of numbers in succession separated by a comma); and Path_Y—Y coordinates of the intermediate points within a path between starting and end exit (e.g., each field may have a series of numbers in succession separated by a comma).

(e) Points database table (PSE_POINTS): stores co-ordinates details. It contains, in one example embodiment, at least the following data fields: ID—unique identifier; X—X co-ordinate; Y—Y co-ordinate; Name—name of point; and Area_ID—the room the point is located in.

(f) Routes database table (PSE_ROUTES): stores routes between exits. It contains, in one example embodiment, at least the following data fields: ID—unique identifier; Starting_Point—starting point cross references the PSE_POINTS table; End_Point—end point cross references the PSE_POINTS table; Distance—distance between starting point and end point; Path_X—X coordinates of the intermediate points between the starting and the end point (e.g., each field may have a series of numbers in succession separated by a comma); and Path_Y—Y coordinates of the intermediate points between the starting and end point (e.g., again, each field may have a series of numbers in succession separated by a comma).

(g) Static (non-moving) object database table (PSE_STATIC_OBJECTS): stores information about non-moving tracked resources. It contains, in one example embodiment, the following database fields: ID—unique identifier; X, Y and Z—X, Y and Z coordinates; Location_ID—room location of the static object; Name—name of object; and Category—object category, e.g. 'fire extinguisher'.

Location Services System: User Display Device

The user display device 116 displays the output from the location services engine. The device also may receive, from the user, instructions that invoke services within the location services engine 110.

The display device 116 has computing capabilities and a user interface. In one embodiment, it may be a laptop, a Personal Digital Assistant (PDA) or a similar computing device with a multimodal user interface.

The multimodal user interface may be, for example, a computer user interface that supports a combination of input modalities such as speech, or mechanical—keyboard and stylus gesture—as well as a combination of output modalities such as aural and visual.

To support different input modalities, the display device or system includes, but is not limited to, (a) an audio input/output system consisting of a microphone, a speaker and an audio codec (b) a display output and keypad/stylus input (c) a multimodal browser which includes a parser, interpreter, an embedded speech recognition engine for text to speech conversion and speech to text conversion and a synchronization element that synchronizes for a user both audio and video inputs and outputs, (d) 802.11b wireless communication capability including the software drivers and the antenna necessary to transmit and receive signals over the network and (e) a software component to interpret transmitted signals or signals received over the network, to deliver output to a user and receive input from a user.

In one embodiment, SVG technology can be used to provide the user with a dynamic and interactive user experience on the user display device 118. The Document Object Model (DOM) for SVG; which includes the full eXtensible Markup Language (XML) DOM, allows straightforward and efficient vector graphics animation. A rich set of event handlers can be assigned to any SVG object that makes up the SVG drawing. Owing to its compatibility and leveraging of other Web standards, features like scripting using JavaScript can be used on SVG objects.

The SVG drawings may be parsed by an SVG plug-in associated with a browser such as, for example, Microsoft Internet Explorer. When an SVG document is obtained from a server by the SVG plug-in running on the client display device, a document object model (DOM) of the document is created inside the browser process. The DOM, in turn, is used by the browser to render the information on the display device.

The visual display created by the SVG document/drawing is event based. When a user queries on the display on the client device, the event handlers associated with the SVG graphical objects associated with the SVG document/drawings are invoked, the pre-defined event is handled, and that may result in a change in the DOM. The changes made to the DOM are reflected in the visual display. Some events on the SVG drawing display may also result in communicating the event to the location services engine 110. Such events may invoke pre-defined services from the location services engine 110.

The SVG documents are parsed, interpreted and rendered by such a browser on the display device. The software component, used to parse and display the received map input on the display device, may include an Internet Explorer browser with a plug-in software program that supports the SVG standard. One such plug-in is provided by Adobe Corporation and another by Corel Corporation. The browser also takes input on the display device, interprets the same based on the DOM generated from the SVG document, and converts it into events. These events result either in a change on the visual display, or may result in one or more HTTP requests to the location services engine 118.

The Creation of the Graph Structure of the Mapped Space:

Prior to the system's usage, a graph data structure is created in the computer's memory from the digital drawing of the mapped space. In one embodiment, this may be done as follows: from the digital drawing of the mapped space, exits, rooms, corner co-ordinates of each room, adjacent exits and distance between pairs of adjacent exits are manually determined and stored in the map database tables. The exits of the mapped space are considered as vertices of the graph data structure and the line joining pairs of adjacent exits is considered as the edge. This graph data structure is used for the operation of Dijkstra's algorithm described below.

Figure 2:
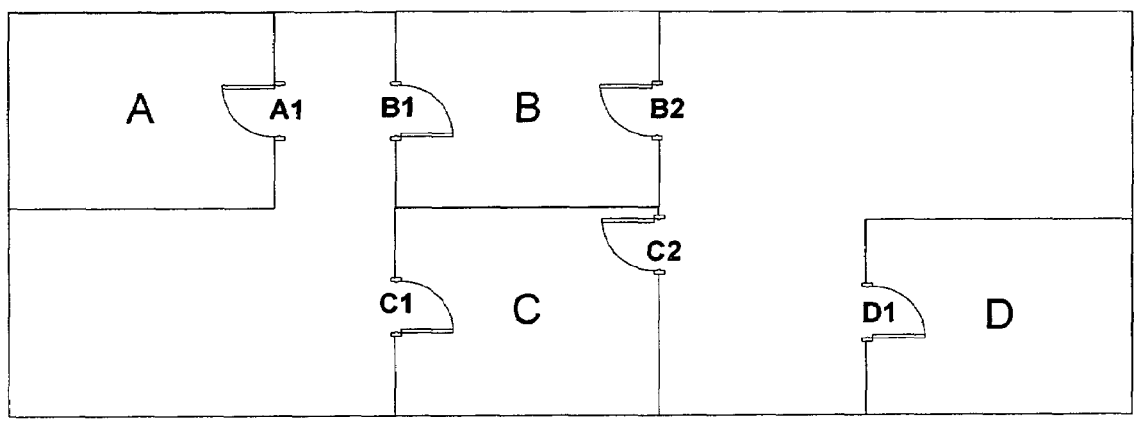
FIG. 2 is an example map of a facility with rooms and exits associated with rooms.
Figure 3A:
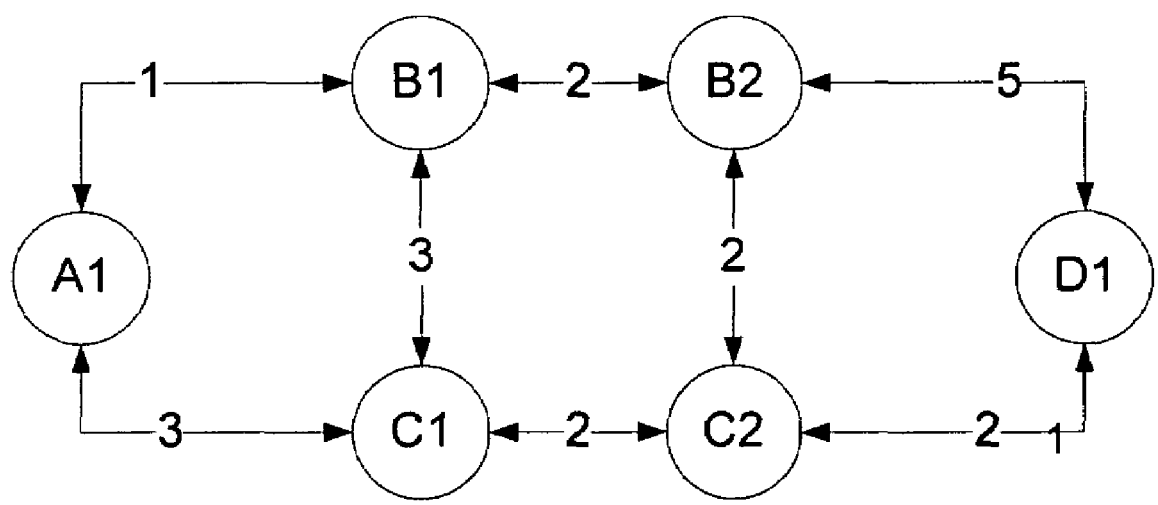
FIG. 3a is an example graph data structure that is created for the map of the facility with rooms shown in FIG. 2.

The creation of the graph structure is hereby explained with an example. FIG. 2 that represents a floor of a facility with several rooms. A, B, C and D are rooms on the floor. A1 is the exit associated with room A. Similarly, B1, B2 are exits associated with room B, C1 and C2 are exits associated with room C, and D1 is the exit associated with room D. For the creation of the graph structure of this floor, as shown in FIG. 3a, the adjacent exits may be determined manually. Adjacent exits are those that can be reached without traversing an intermediate exit—thus exit A1 is adjacent to exit B1 and C1, exit B1 is adjacent to exit A1 and C1, exit C1 is adjacent to exit C2, B1 is adjacent to exit B2 and both B2 and C2 are adjacent to exit D1. In the next step, the exits are plotted on a graph as nodes. Lines, representing edges, are drawn joining adjacent nodes/exits. The lines/edges joining adjacent exits/nodes are assigned weights (in one embodiment the edge weight is distance between pairs of adjacent exits and in another embodiment the edge weight is time taken to travel between pairs of adjacent exits). For example, as shown in FIG. 3a, the line joining adjacent exits A1 and B1 has an edge weight of 1. Using such a graph data structure, Dijkstra's algorithm is used to calculate the shortest path between pairs of exits (as explained in detail below), where the shortest path is that chosen path, from all possible paths joining two exits, which has the lowest sum total of edge weights.

Location Services Engine—Shortest Path Service

The location services engine provides the shortest path service to the user. The shortest path may be determined using Dijkstra's shortest path algorithm.

The location services engine 110 communicates the digital map of the mapped space to the user display device 116 for display. In one embodiment, the location services engine communicates the digital map of the mapped space as an SVG document to the user display device. The browser on the display device interprets and displays the SVG document. The user requests the location services engine to determine the shortest path from a starting room to a destination room the user wishes to reach. The starting and destination rooms are identified by the user on the displayed map by, e.g., (a) querying on the display device, using a stylus, the area of the screen which displays a room in which the user is located (starting room), (b) querying on the display device, using stylus, the area of the screen showing the destination room the user wishes to reach (destination room).

In another example embodiment, the user may identify the starting and destination rooms by specifying their pre-defined attribute. In this embodiment, the user can use the audio mode of input to specify the attribute.

The events generated from the user's query on the displayed map are interpreted by the browser and are handled by the event handler specified in the SVG document. In response, the event handler creates and sends HTTP requests to the location services engine.

From the user query (HTTP requests), the location services engine 110 identifies the room identifiers associated with the starting and destination rooms. It uses the room identifiers to query location database 112 for determining the room co-ordinates (obtained from the table PSE_ROOMS) and the exit co-ordinates (obtained from the table PSE_EXITS) associated with the starting and destination rooms. The starting room and destination room may have multiple exits associated with them.

The location services engine then uses, in some example implementations, Dijkstra's algorithm for calculating the shortest path between all pairs of exits (a pair of exits in these examples includes one exit each associated with the starting and destination rooms). The inputs to the Dijkstra's algorithm are the starting room exit co-ordinates and the destination room exit co-ordinates. The algorithm also has as its input the graph of the mapped space (as described above).

For the shortest path calculation, the Dijkstra's algorithm obtains exit co-ordinate information from the exit table (PSE_EXITS) stored in the location database, and the edge data from the adjacent exits table (PSE_PATH) also stored in the location database. The edge weight, which is the distance between adjacent exits, is obtained from the adjacent exits table. In another embodiment, the edge weights joining adjacent exits may be the time taken to travel between them.

The output of the Dijkstra's algorithm (explanation below) is a shortest path for all exit pairs in a facility. The location services engine uses this information to determine the shortest path connecting a pair of rooms. The location services engine plots a line through the co-ordinates through which the shortest path passes. The location services engine superimposes the plotted path on the digital map and communicates it to the display device for display to the user.

The data input of Dijkstra's algorithm in these described examples include a weighted directed graph G, an example of which is shown in FIG. 3a, and a source vertex s, such as A1 in FIG. 3a, in G. V denotes the set of all vertices ({A1, B1, B2, C1, C2, D1} in FIG. 3a) in the graph G. Each edge of the graph is an ordered pair of vertices (u,v) representing a connection from vertex u to vertex v. The set of all edges ({A1-B1, A1-B2, C2-D1, C1-D1, B1-B2, C1-C2, B1-B2, C1-C2 in FIG. 3a) is denoted E. Weights of edges are given by a weight function E→[0, ∞]; therefore w(u,v) is the non-negative cost of moving from vertex u to vertex v. For a given pair of vertices s and t in V, the algorithm finds the path from s to t with lowest cost.

The algorithm works by keeping for each vertex v the cost d[v] of the shortest path found so far between s and v. Initially, this value is 0 for the source vertex s (d[s]=0), and infinity for all other vertices, representing the fact that no path leading to those vertices is known (d[v]=∞ for every v in V, except s). When the algorithm finishes, d[v] will be the cost of the shortest path from s to v—or infinity, if no such path exists. The basic operation of Dijkstra's algorithm is "edge relaxation": if there is an edge from u to v, then the shortest known path from s to u (d[u]) can be extended to a path from s to v by adding edge (u,v) at the end. This path will have length d[u]+w(u,v). If this is less than the current d[v], the current value of d[v] may be replaced with the new value.

Edge relaxation is applied until all values d[v] represent the cost of the shortest path from s to v. The algorithm is organized so that each edge (u,v) is relaxed only once, when d[u] has reached its final value.

The algorithm maintains two sets of vertices S and Q. Set S contains all vertices for which the value d[v] is already known as the cost of the shortest path, and set Q contains all other vertices. Set S starts empty, and in each step one vertex is moved from Q to S. This vertex is chosen as the vertex with lowest value of d[u]. When a vertex u is moved to S, the algorithm relaxes every outgoing edge (u,v).

Figure 3B:
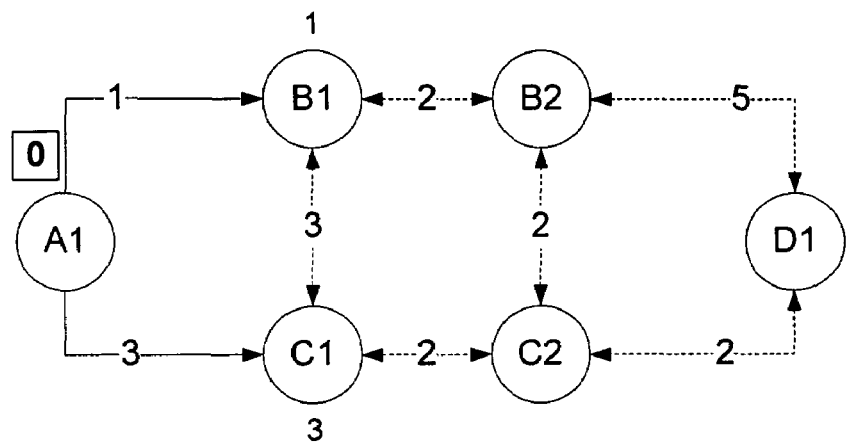
FIGS. 3b, 3c, 3d, 3e, and 3f are example diagrams showing the working of Dijkstra's algorithm.
Figure 3C:
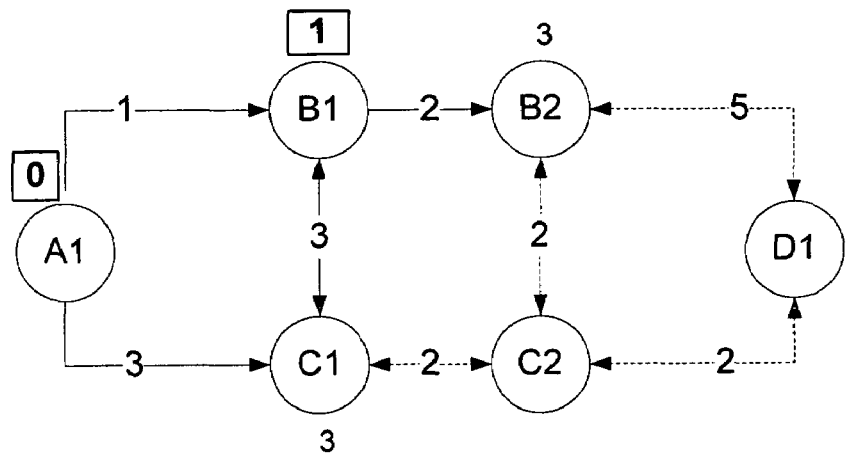

Dijkstra's algorithm can be understood by referring to FIG. 3b which operates on the graph of FIG. 3c (the creation of the graph was explained above). As shown in FIG. 3a, there are 6 vertices in this graph, representing the exits of a building. Some of these exits are adjacent to each other and are thus shown to be connected by edges in the graph in FIG. 3a. The aim is to find the shortest path between source vertex A1 to vertex D1 using Dijkstra's algorithm.

At the start, the shortest path from A1 to A1 is calculated. This distance is 0. A square label next to A1 is marked with 0 (refer to FIG. 3b). Next, "edge relaxation" is carried out for exits directly connected to A1. The edge weights for reaching exits directly from A1, viz. B1 and C1, are determined. The edge weight between exits A1 and B1 is 1, and the edge weight between A1 and C1 is 3. In the next step, the directly reachable exit with the smallest edge weight value is determined, and in this case it is B1. So 1 is written against B1, and is represented in a square label (FIG. 3c) as an indication that this is the least sum of edge weight for the shortest path to B1 from A1.

Next, edge weights for reaching exits that are directly reachable from B1, viz. C1 and B2, are calculated. The edge weight to exit B2 is 2, and edge weight value to exit C1 is 3. The sum of edge weights to reach B2 from A1 via B1 is 3. The sum of edge weights to reach C1 from A1 via B1 is 4.

Figure 3D:
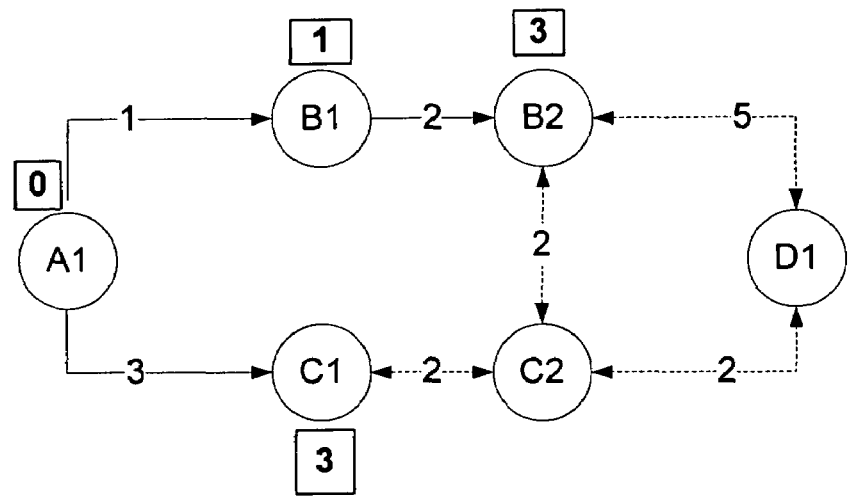

Thus, the sum of edge weights to reach B2 via A1 is equal to sum of edge weight to reach C1 directly from A1. Hence, the value 3 is written against both B2 and C1 and written to a square label (FIG. 3d), indicating that shortest paths to both exits B2 and C1 from source vertex A1 have been determined.

Figure 3E:
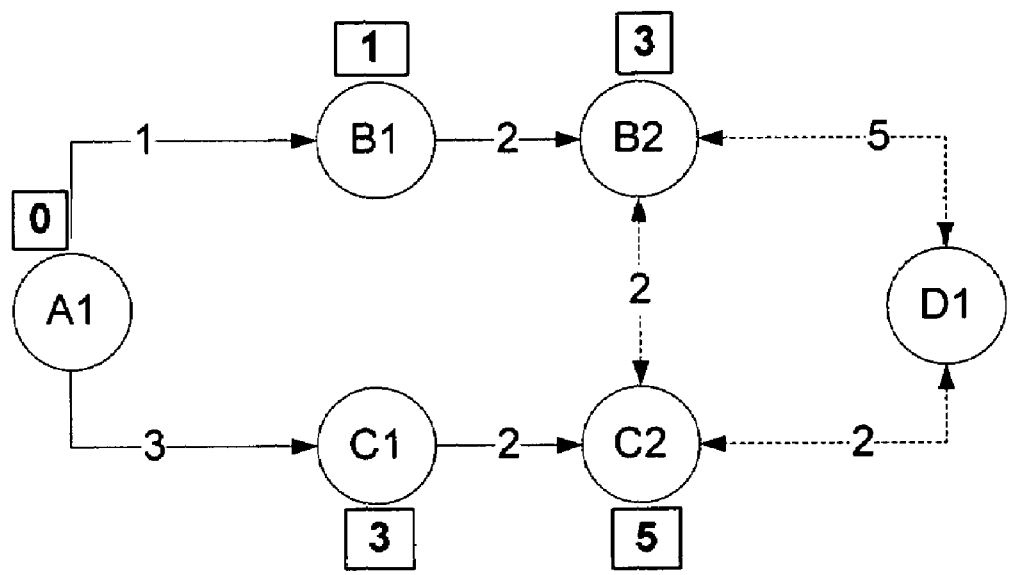

Next, edge weights for reaching exits directly from B2 and C1 are determined. From B2, C2 can be reached with edge weight of 2, and D2 can also be reached with an edge weight of 5. From C1, C2 can be directly reached with an edge weight of 2. Thus, the overall sum of edge weights from A1-B1-B2-C2 is 5 and the overall sum of edge weights from A1-B1-B2-C2 is 8. Also, the sum of edge weights to reach C2 from A1-C1 is 5. Thus, the minimum sum of edge weights to reach C2 via A1-C1 is 5. The edge weight value 5 is written against C2 and a square label is assigned to it (FIG. 3e), indicating that the calculation for shortest path to reach vertex C2 is over.

Figure 3F:
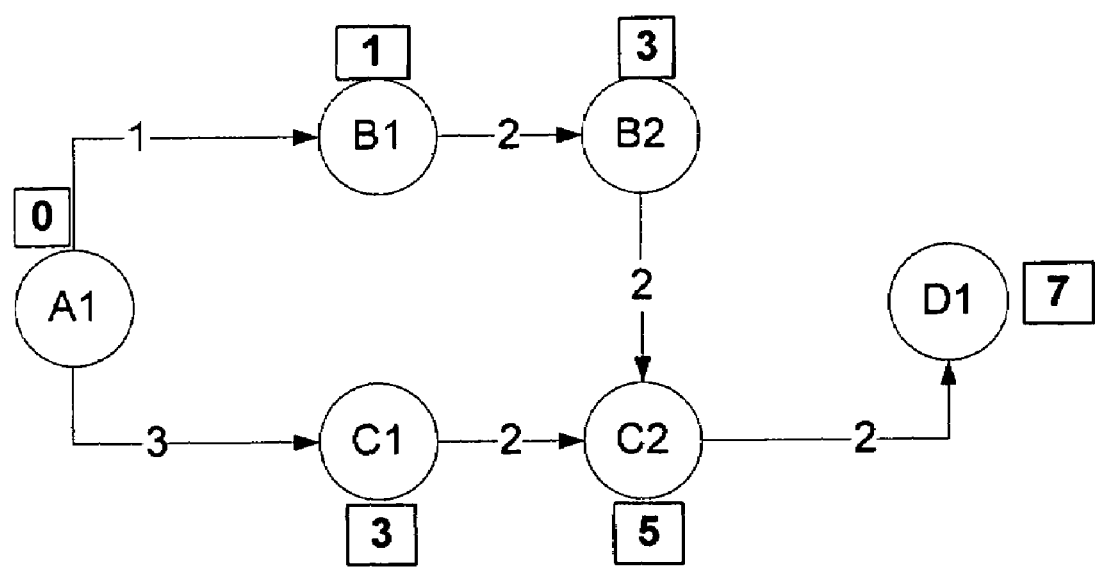

Next, the edge weight of exit directly reachable from C2 is determined, which is D1 where the edge weight value is 2. Thus, the sum of edge weights to reach D1 from C2, either via A1-B1-B2-C2 or via A1-C1-C2 is same—which is 7. The sum of edge weights to reach D1 via A1-B1-B2-D2 is 8. Thus, the shortest overall sum of edge weights to reach D1 from A1 is 7, and this value is written against D1. A square label is assigned to it (FIG. 3f).

In this fashion, the Dijkstra's algorithm is used to find the shortest path between a source vertex (in the above example referred as A1) to a destination vertex (vertex D1), where the shortest path is the path with the least overall sum of edge weights.

Operation of Location Services Engine 110 for the Shortest Path Service

Figure 4A:
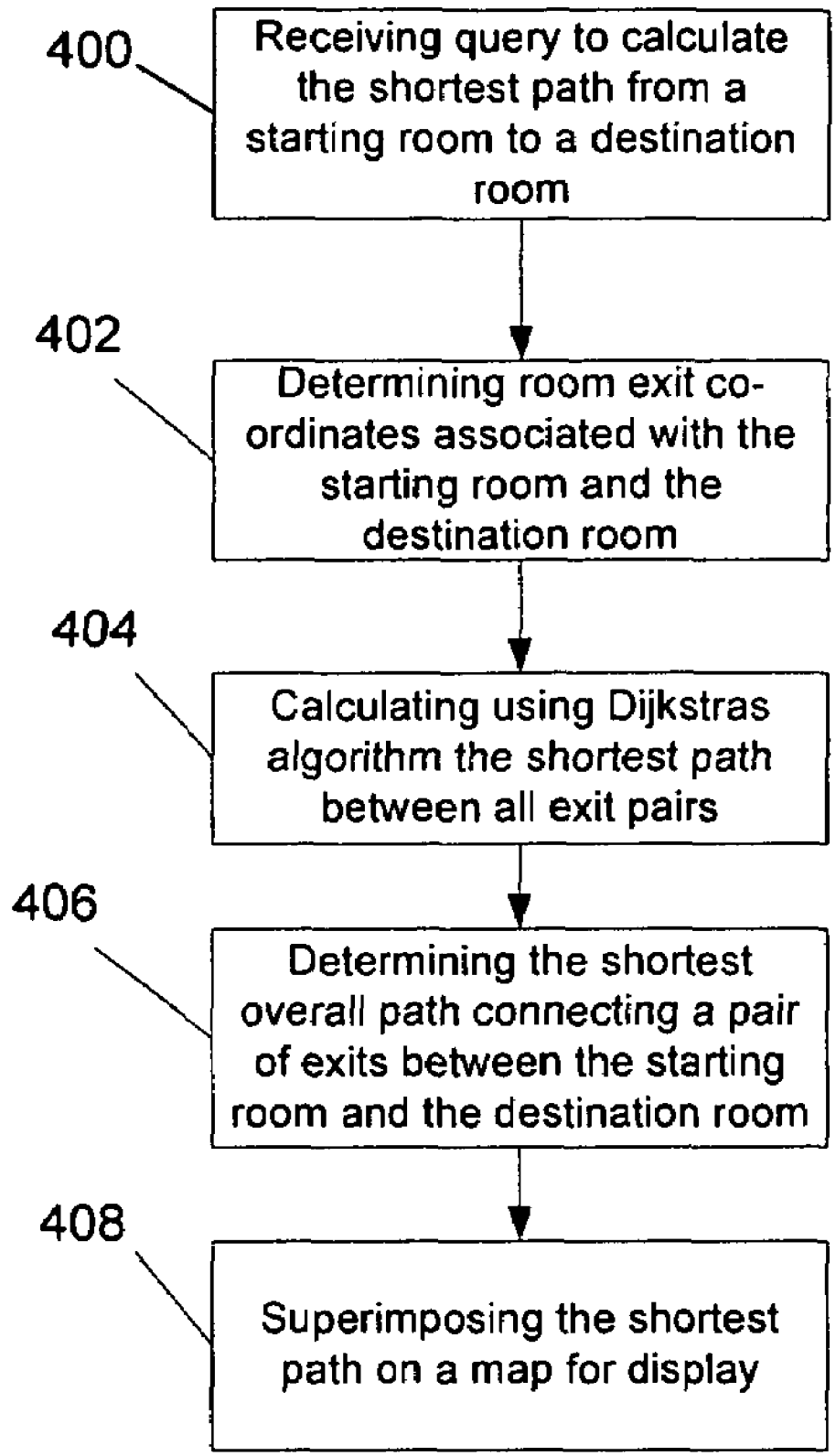
FIG. 4a is a flow chart illustrating an example method for finding out the shortest path between a starting room and a destination room.

In FIG. 4a, the user queries the location services engine to find the shortest path from a starting room to a destination room (the room the user wishes to reach) (400). In one embodiment, the user may identify the starting and destination room by querying using stylus the area on a display screen that displays the starting and destination rooms. Next, the location services engine determines from the location database, the exit co-ordinates associated with both starting and destination rooms (402). Multiple exits may be associated with the starting and destination rooms. The location services engine invokes the Dijkstra's algorithm to calculate the shortest path between all pairs of exits between the starting room and the destination room (404) (a pair of exits consists of one exit each of the starting and destination rooms). Dijkstra's algorithm takes as its input the starting and destination room exit co-ordinates. It also takes as its input the edge weights (distance between adjacent exits) from the adjacent exits table (PSE_PATH table).

Using this data, the Dijkstra's algorithm calculates the shortest path between all pairs of exits associated with starting room and destination room—and it outputs the shortest path co-ordinates, which includes the destination exit co-ordinates and other intermediate exit co-ordinates through which the shortest path traverses (404). Then, the location services engine determines the shortest overall path connecting any one pair of exits between the starting room and the destination room (406). The location services engine plots a path through the co-ordinates of the shortest overall path and superimposes it on the digital map of the mapped space for display on the user display device (408). In case more than one path has the same shortest overall distance between a starting room and a destination room, the location services engine plots a path through all such paths and superimposes them on the digital map of the mapped space for display on the user's display device.

Figure 4B:
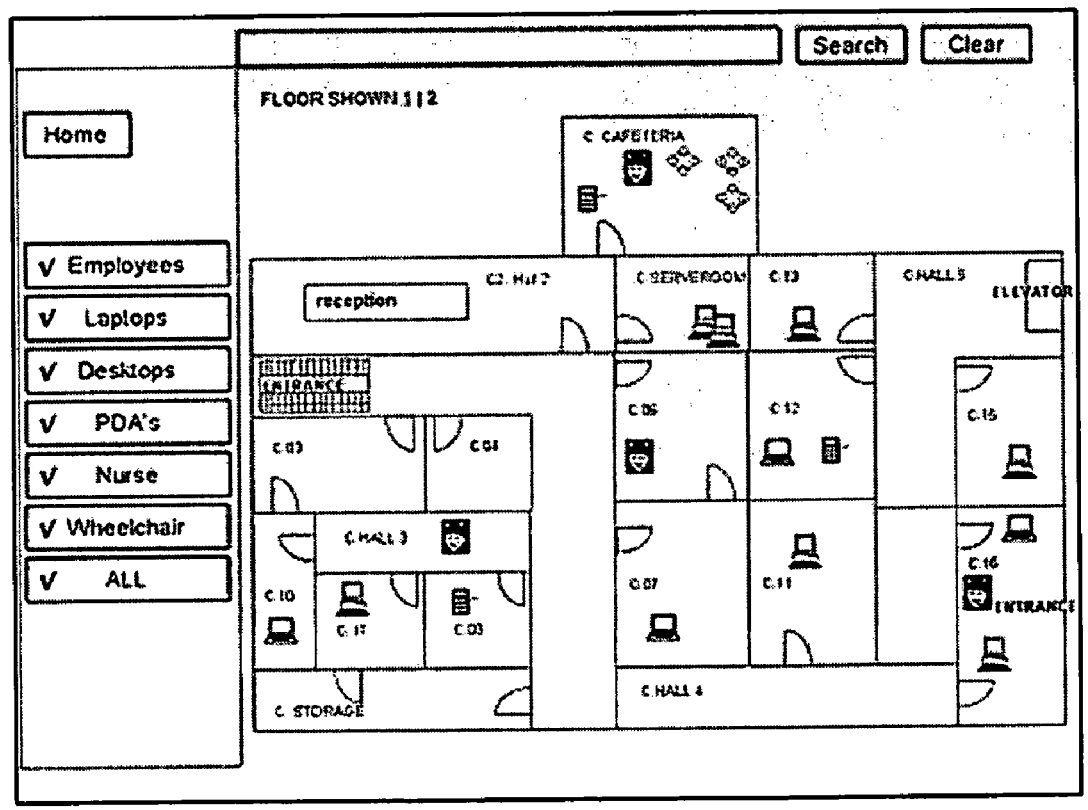
FIG. 4b is a screenshot displaying the floor map of a facility.

FIG. 4b is a screenshot of the user's display device, showing an interactive floor map of a hospital facility. The floor map of the facility displays the various rooms on the floor. Also shown are icons that display the tracked resources inside the facility—such as computers, wheelchairs and nurses. Each room is indicated by identifiers like C.07 or C.CAFETERIA. The starting room is the room containing the user and in this case it is the room marked as C.CAFETERIA.

Figure 4C:
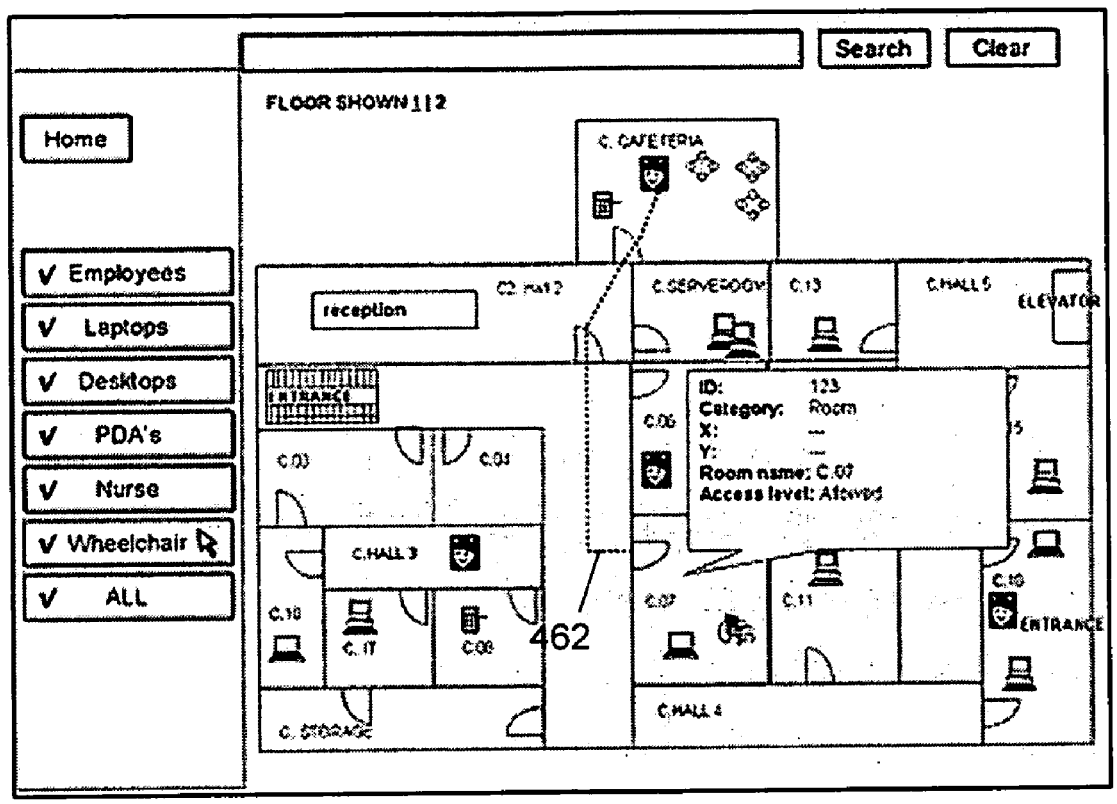

As understood from FIG. 4c, the user may query the location services engine to find the shortest path from the starting room C.CAFETERIA to the destination room C.07. The user may specify a destination room by clicking on the icon C.07. The user request is communicated to the location services system, which calculates the shortest path 462 to the destination room C.07. The location services system then displays the shortest path 462 to the destination room C.07, superimposed on the interactive graphical map as shown in the screenshot FIG. 4c.

In another embodiment, Dijkstra's algorithm is used to predetermine the shortest path between all combinations of exits. In this case, each pair of exits is given as input to Dijkstra's algorithm along with a graph of the mapped space. The algorithm determines the shortest paths between all pairs of exits. In one embodiment, the shortest path joining exit pairs may be the path with the least distance between the exit pairs. In another embodiment, the shortest path joining exit pairs may be the path that takes the least time to travel.

The predetermined shortest paths between all pairs of exits are stored in a shortest path database table (PSE_ROUTES) in the location database, where the exit pairs are identified by their exit identifiers.

When the location services engine receives a user query to determine the shortest path between two rooms, it determines the exit co-ordinates associated with the rooms from the location database table (PSE_ROOMS and PSE_EXITS). It also determines the exit identifiers associated with the rooms. Then, the location services engine uses the exit identifiers, to retrieve from the shortest path database table (PSE_ROUTES) the shortest path connecting pairs of exits. There may be multiple exits associated with the starting room and the destination room. For each exit pair, the location services engine queries the shortest path database table (PSE_ROUTES) for the shortest path between that pair of exits. Since, in these examples, the shortest path for all exit pairs are pre-calculated, the query response time is extremely fast. The location services engine may determine the shortest overall path joining any one pair of exits of the starting room and the destination room, from the various shortest paths connecting all exit pairs of starting and destination rooms. Then, the location services engine plots a path through the co-ordinates through which the shortest path passes. The location services engine superimposes the plotted path on the digital map and communicates it to the display device for display to the user.

Figure 5:
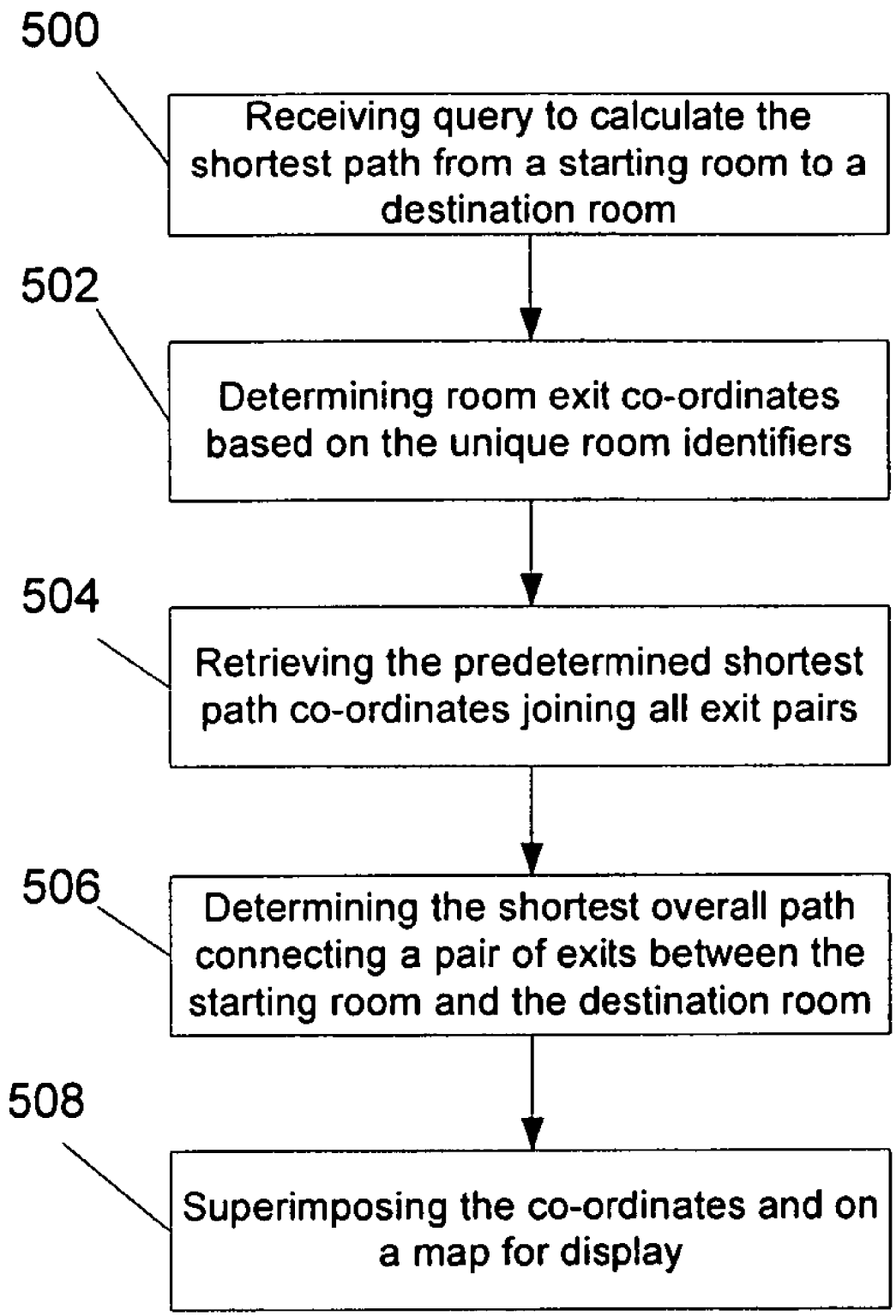
FIG. 5 is a flow chart illustrating a method for finding the shortest path between a starting room and a destination room according to an alternate example implementation.

In FIG. 5, the user queries the location services engine to find the shortest path from a starting room to a destination room (500). In one embodiment, the user may identify the starting and destination room by querying, using a stylus, the area on a display screen that displays the starting and destination rooms. The location services engine then uses the room identifiers, e.g., associated with rooms identified by the user, to query the location database for exit co-ordinates and exit identifiers of both starting and destination rooms (502). The starting room and destination room may have multiple exits associated with them. The location services engine uses exit identifiers to retrieve the shortest path co-ordinates data from the shortest path database table (PSE_ROUTES) for each pair of exits between the starting room and the destination room in (504). From this data, the location services engine determines the shortest overall path between a pair of exits in (506). Then the location services engine plots the shortest path through the shortest path co-ordinates, which includes the starting room exit co-ordinate, the intermediate exit co-ordinates and the destination exit co-ordinate, and superimposes it on the digital map of the mapped space for display on user's display device (508). In case more than one path has the same shortest overall distance between pairs of exits between a starting room and a destination room, the location services engine plots a path through the co-ordinates of each such path and superimposes them on the digital map of the mapped space for display on the user's display device.

Location Services Engine: Identify the Closest Tracked Resources

The user queries the display device to identify tracked resources of interest closest to him/her. The user invokes the relevant service, and then identifies the resource he/she wants to locate closest to himself/herself by defining the resource attribute. In one embodiment, the user may identify the tracked resource by querying the area on a display screen displaying the tracked resource. In another embodiment, the user may identify the tracked resource by querying a button representing the tracked resource displayed on a display screen.

An example of a use of this embodiment in a hospital may be a nurse, wanting to locate a wheelchair closest to him.

The display device communicates the user's request to the location services engine. In one embodiment, the user's request is communicated to the location services engine as an HTTP request. The location services engine determines the tracked resource identifier and the tracked resource attribute from the user request. The location services engine queries the tracked resources table to identify the tracked resources associated with the user defined attribute. It queries the PSE_POINTS table to determine the instantaneous co-ordinates of the tracked resources and the rooms they are located in. The location services engine also determines the user's instantaneous co-ordinates and the room he/she is located in.

The location services engine then invokes the Dijkstra's algorithm to determine the shortest paths between the exits associated with the room the user is located in, and the exits associated with the room tracked resources are located in. Dijkstra's algorithm has as its input the digital map of the mapped space, where Dijkstra's algorithm treats the exits as the vertices and the line joining adjacent exits as the edges. Dijkstra's algorithm obtains exit co-ordinates information from the exit table (PSE_EXITS) stored in the location database, and the edge data from the adjacent exits table (PSE_PATH) also stored in the location database.

Dijkstra's algorithm uses the above mentioned inputs to determine the shortest path to the rooms where tracked resources with user defined (e.g., user-specified) attributes are located. The output from Dijkstra's algorithm is the set of exits through which the shortest paths to all tracked resources will traverse.

Dijkstra's algorithm also outputs the distance of each of these shortest paths, and the co-ordinates through which each of these paths passes. Using this information, the location services engine chooses the path with the least overall distance. Using the exit co-ordinates of the path with the least overall distance, the location services engine displays the path superimposed on the digital map of the mapped space and communicates it to the display on the user's device.

In one example embodiment(s), the service to identify the closest tracked resource can be used in a hospital to identify the closest vacant operating theatre, the closest oxygen cylinder, the closest doctor, the closest wheelchair etc.

Figure 6A:
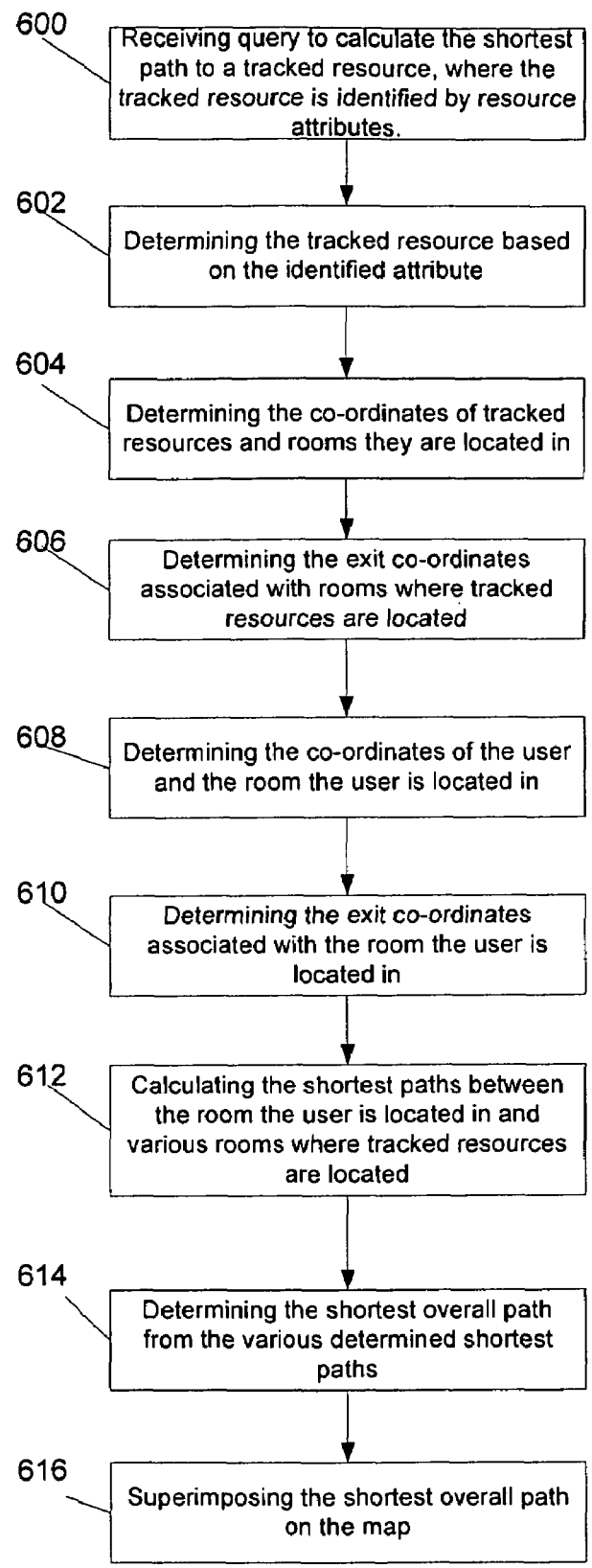
FIG. 6a is a flow chart illustrating a method for determining the shortest path between a user and a tracked resource closest to the user, where the tracked resource may be identified by the user.

Operation of Location Services Engine to Identify the Closest Set of Tracked Resources from the User In FIG. 6a, the user invokes the service to identify a tracked resource of interest closest to him/her, where the tracked resource is identified by specifying a tracked resource attribute (600). The user request is communicated to the location services engine. The location services engine determines the tracked resource of interest based on the specified attribute from the location database (602). The location services engine queries the positioning engine to determine the co-ordinates of identified tracked resources and the rooms they are located in (604). Then, the location services engine determines the exit co-ordinates associated with the rooms where tracked resources are located (606). It also queries the location database to determine the co-ordinates of the user and the room the user is located in (608). Then, the location services engine determines the exit co-ordinates of the room the user is located in (610). The location services engine then invokes the Dijkstra's algorithm to calculate the shortest paths between the exits of the room the user is located in, and the exits of various different rooms where the tracked resources are located (612).

The location services engine then determines the shortest overall path from all shortest paths calculated (614). The location services engine plots the shortest overall path and superimposes it on the map display for display on user's display device (616).

Figure 6B:
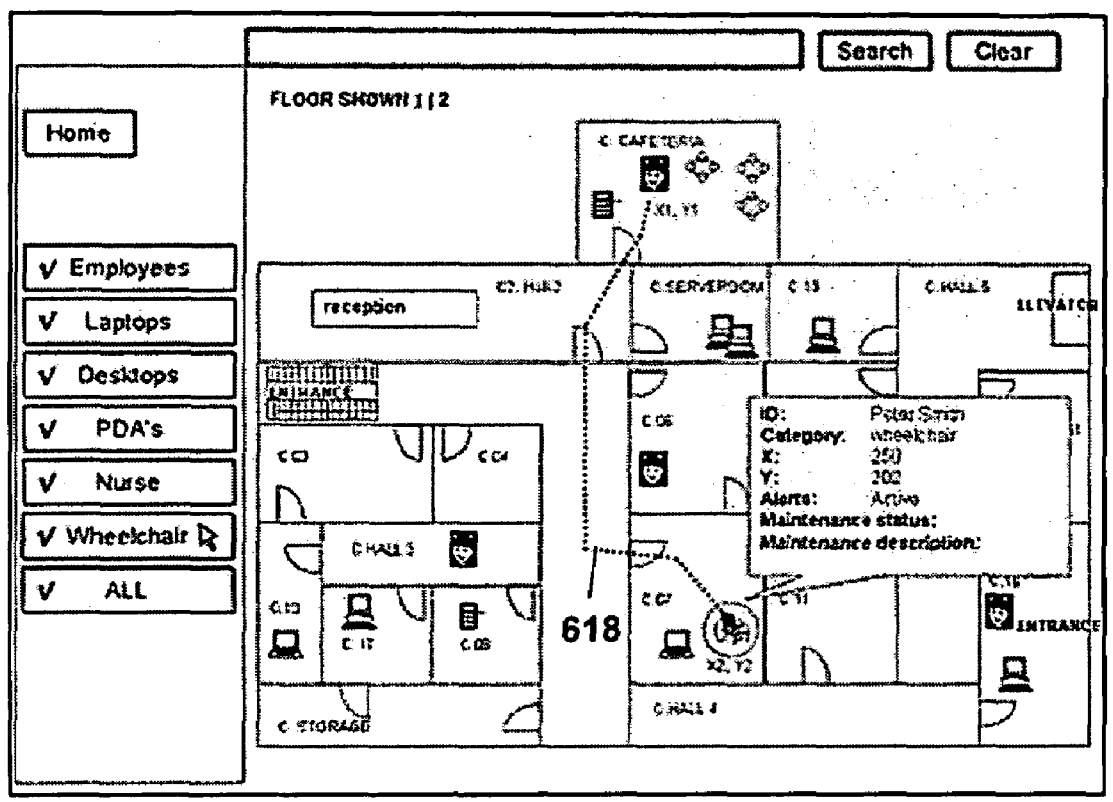
Figure 7:
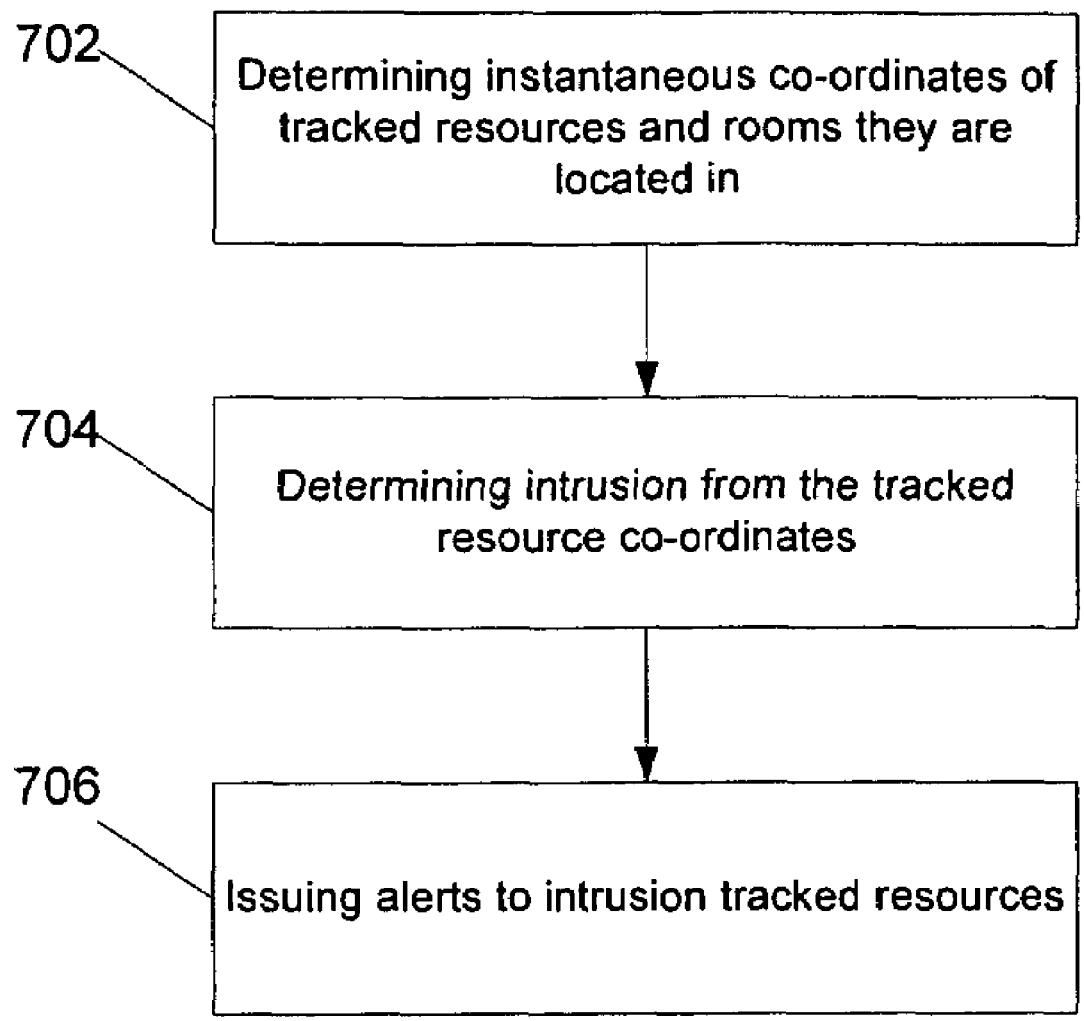
FIG. 7 is a flow chart illustrating a method for issuing alerts to tracked resources.

FIG. 6b is a screenshot of a user's display device displaying the shortest path between a user and a wheel chair, which is the tracked resource of interest. This screenshot displays an interactive graphical map of a floor of a hospital facility. The floor map of the facility displays the various rooms on the floor. Also shown on the interactive graphical map are icons that display the tracked resources inside the facility—like computers, rooms and people.

The starting room is the room containing the user and in this case it is C.CAFETERIA. The user queries the location services engine to locate a wheelchair closest to him/her. The user does this by clicking on the wheelchair check button displayed on the browser toolbar on the left side of the screen as shown in the screenshot FIG. 6b. The user request is communicated to the location services engine, which identifies all wheelchairs in the facility. The location services system then calculates the shortest path to each wheelchair, and using this data, identifies the wheelchair closest to the user. It then displays the shortest path to the wheelchair from the user superimposed on the interactive graphical map as shown in the screenshot FIG. 6b. The location services system also displays the properties associated with the wheelchair in FIG. 6b.

Location Services Engine Service to Provide Restricted Areas Alerts

The location services engine provides restricted area alerts to the user's display device.

The location services engine gets periodic updates on the instantaneous co-ordinates of the tracked resources (e.g. laptops, mobile phones with cameras etc.) from the positioning engine. From this information, the location services engine determines the room the tracked resources are located in.

For every tracked resource, the location database stores pre-defined access levels. The access level granted to a tracked resource determines what rooms the resource would be permitted to enter. This information, along with the tracked resource location, is used to detect intrusion. If a tracked resource is detected in a restricted area, the location services engine sends an alert to the user. This service is especially useful in corporate offices where certain areas are restricted for use of instruments like laptops, mobile phones etc.

Operation of Location Services Engine for Restricted Areas Alert Service

The location services engine determines instantaneous co-ordinates of tracked resources and the rooms they are located in from the periodic updates it receives from the positioning engine (702). The location services engine determines intrusion by a tracked resource by comparing its instantaneous location inside a room, with its pre-defined access level stored in the database table (704). If intrusion is detected, the location services engine communicates it to the user (706).

Location Services Engine Service Providing Travel History of Tracked Resources

The location services engine periodically receives the following information for each of the tracked resources from the positioning engine: (a) the tracked resource identifier, (b) its instantaneous co-ordinates, (c) the time stamp information associated with the co-ordinates and (d) the room the tracked resource was in based on the determined co-ordinates.

The location services engine archives the instantaneous co-ordinates of tracked resources in the travel history archive 114.

A user queries the display device to obtain the travel history of tracked resources of interest. The user does so by invoking the tracked resource travel history service and identifying the tracked resource of interest by defining its attribute. The users request is communicated to the location services engine. In one example embodiment the user's request is communicated to the location services engine as an HTTP request.

The location services engine queries the tracked resources table to identify the tracked resources based on the attributes specified by the user. The query yields the identifiers for the tracked resources that are of interest for the user. The location service engine uses the tracked resource identifiers to extract the travel history of the tracked resource from the travel history archive. Upon receiving the travel history, the location services engine plots a path through the archived co-ordinates of the tracked resources—e.g., by plotting a line through the co-ordinates. Once the paths are plotted, the location services engine super-imposes the plotted paths on the digital map of the mapped space. It then communicates the digital map of the mapped space to the user's device for display.

In a hospital, the travel history archive may be used, for example, to study and optimize the movement of equipment. Certain equipment is moved between rooms in a hospital setting; as a result, for example, knowing their usage patterns from the history archive may help optimize their location within the hospital setting, such that, for example, it is closest to the place where it is used the most.

Figure 8:
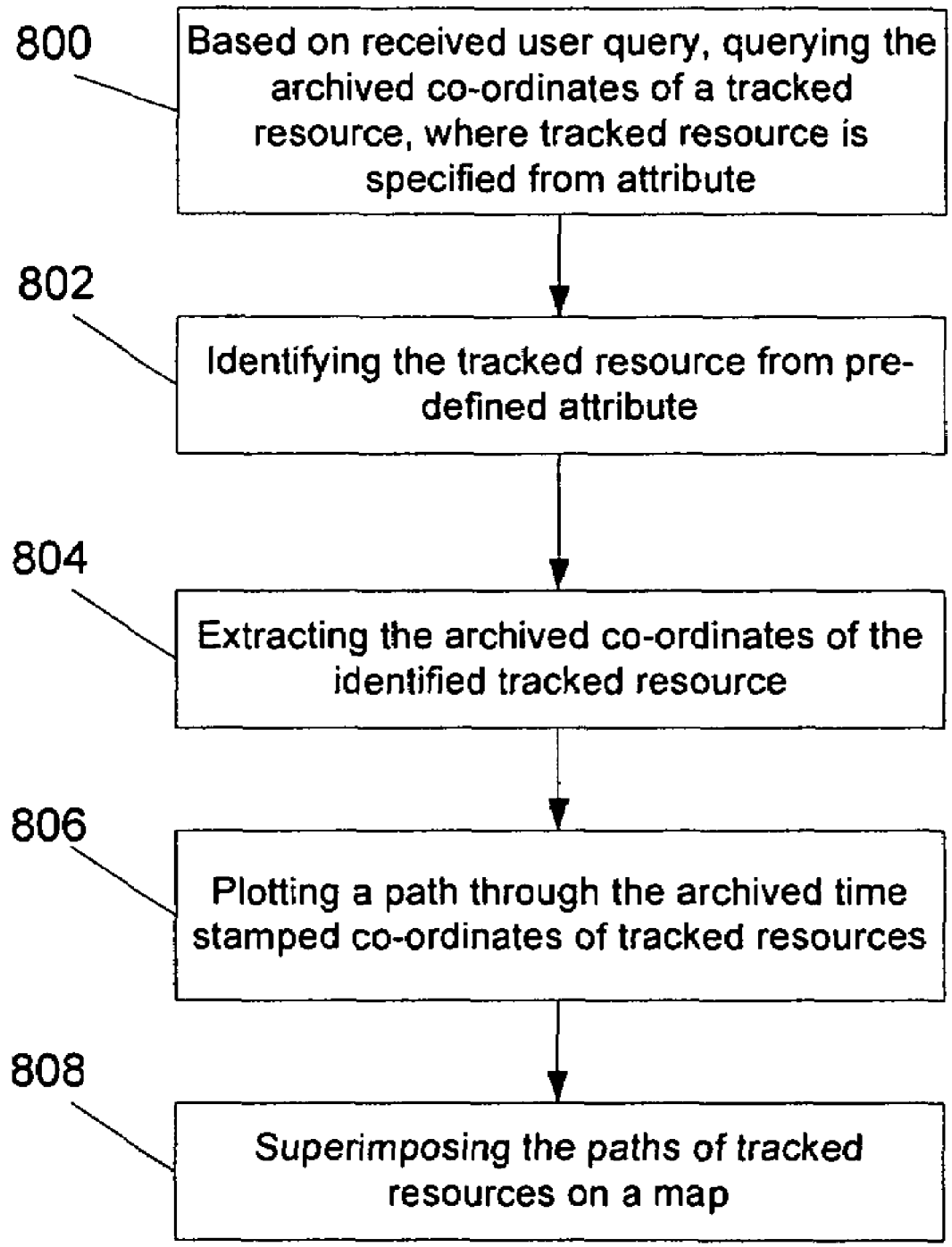
FIG. 8 is a flow chart illustrating a method for plotting a path through archived co-ordinates of tracked resources.

Operation of Location Services Engine for Finding the Traffic History of Tracked Resources Referring to FIG. 8, a user queries the display device for the traffic history of a tracked resource, where the user specifies the tracked resource from its attributes (800). The user request is communicated as HTTP requests to the location services engine. The location services engine queries the location database to identify the tracked resources based on the attributes specified by the user (802). The location services engine extracts the traffic history of the tracked resources from the traffic history archive (804). The location services engine then plots a path through the extracted co-ordinates of tracked resources. The plotting of the path involves drawing a line through the co-ordinates of tracked resources (806). A tracked resource may have traveled many paths. Once all the paths taken by tracked resources are plotted, the location services engine superimposes the plotted paths on the digital map of the mapped space and displays it on the user's display device (808).

Figure 9:
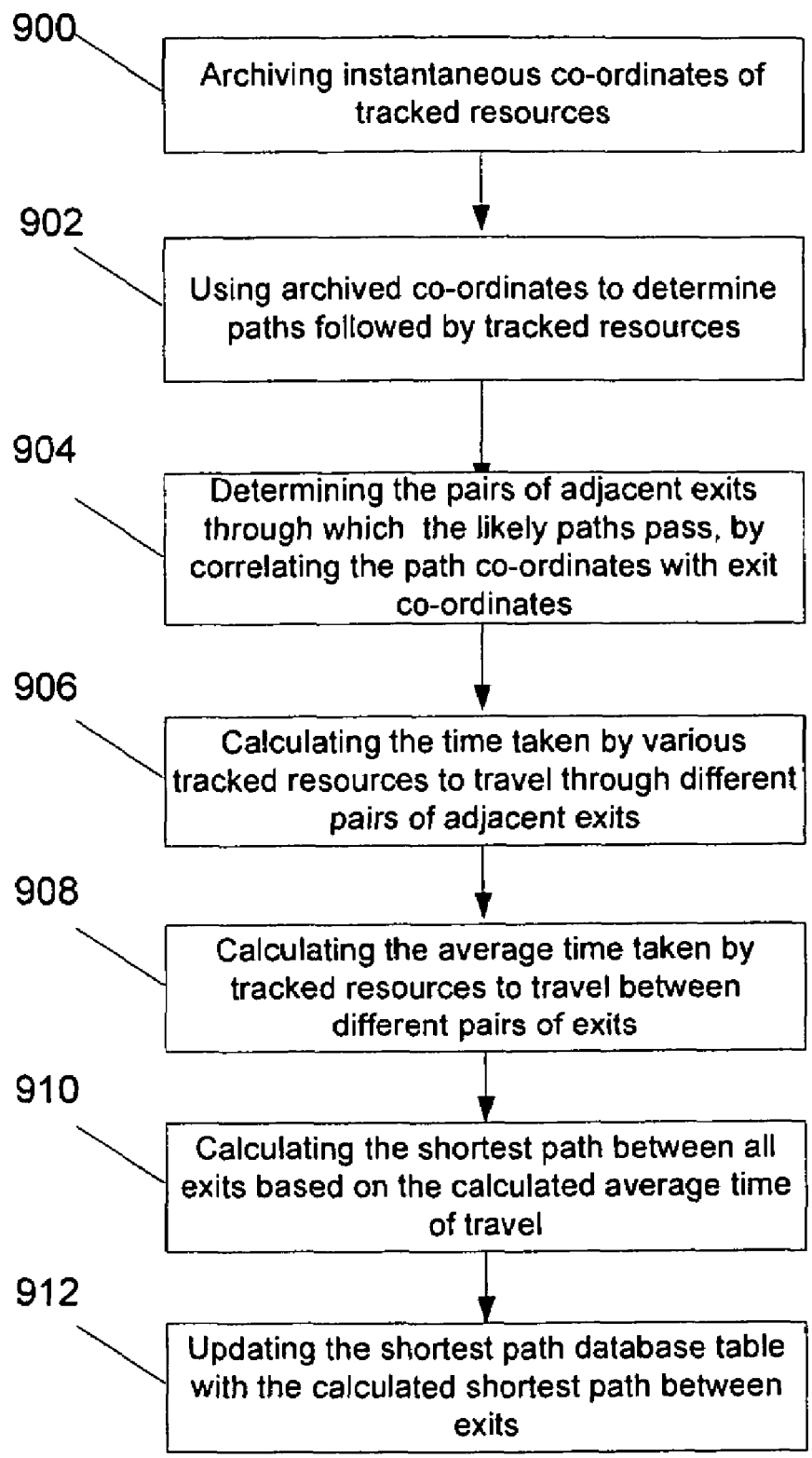
FIG. 9 is a flow chart illustrating the working of the location services system of FIG. 1 for calculating and updating the shortest path database table.

In another embodiment, as illustrated in FIG. 9, using the travel history of tracked resources, the location services system calculates the time taken by tracked resources to travel between pairs of adjacent exits. This may be done as follows: The location services system archives the instantaneous co-ordinates with the time stamps of tracked resources in the traffic history archive (900). Using this information, the location services system determines the potential, e.g., likely, paths followed by the tracked resources (902). Each path of a tracked resource may pass through one or more pairs of adjacent exits. Hence, from the likely paths of tracked resources, the location services system determines the pairs of adjacent exits traversed by each tracked resource; e.g., by correlating the co-ordinates of the exits (stored in the PSE_EXITS table) with the path plot co-ordinates (904). For each pair of adjacent exits, the location services system determines the time taken to travel the distance between them. For this, the location services engine may use the information of overlapping tracked resource co-ordinates (which have embedded time stamps) with the exit co-ordinates (906). The location services system then averages out the time taken by one (or more than one) tracked resources to travel the distance between each pair of adjacent exits (908). Location services system uses this data of time taken to travel between adjacent exits as edge weights in Dijkstra's algorithm for the calculation of shortest path, where the shortest path is the path that takes the least time to travel (910). Finally, the location services system updates the shortest path database table with the calculated shortest paths between adjacent exits (912).

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional information storage device and a printing device.

It is to be further understood that since some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A system for enabling the monitoring and navigation of a facility including a plurality of identifiable spaces each associated with one of a plurality of exits, the spaces and exits being linked by a network of pathways, or for determining the position and travel history of tracked resources residing in one of the spaces or moving along the pathways, comprising:
   (a) a map database operable to store digital map data relating to the facility;
   (b) a position determination system operable to receive sensor information from at least one sensor, the sensor information identifying the various resources, spaces, and associated exits, the position determination system further operable to develop relational data identifying a relative position of each said resource, space, and exit within said facility, based on the sensor information and the map data; and
   (c) a location database operable to store said relational data in tables including space-identifying data, tracked-resource data, and exit-identifying data.

2. The system of claim 1, wherein the position-determination system is further operable to time-stamp the relational data, and further including a travel history archive operable to store time and position data relating to a tracked resource of the tracked resources, using the time-stamped relational data.

3. The system of claim 1, wherein the tables further include adjacent exit-relational data, point-identifying data, and/or non-adjacent exit-connecting data.

4. The system of claim 3, further including a location services engine operable to respond to a user request and to use said space-identifying data, said tracked-resource data, said exit-identifying data, said adjacent exit-relational data, said point-identifying data, and/or said non-adjacent exit-connecting data to provide services including one or more of identifying and displaying the shortest path between any two of said exits, identifying and displaying the closest tracked resource, providing intrusion alerts for restricted spaces, and/or displaying travel history of tracked resources.

5. The system of claim 1, wherein the at least one sensor includes a plurality of electromagnetic sensors disposed within the spaces and/or along the connecting paths throughout the facility and operable to identify a position of a person or object within the facility.

6. The system of claim 1, further including a user interface operable to receive, from the user, information and services requests to the system, and further operable to display outputs generated by the system.

7. The system of claim 6, wherein the user interface includes a multimodal interface that is operable to receive the information and service requests by voice command, and further operable to audibly provide intrusion alerts.

8. The system of claim 6, wherein the user interface is operable to receive a user input and to display output, and includes a web browser on a computer terminal, the web browser supporting scalable vector graphics.

9. The system of claim 1 wherein the position determination system includes
   a positioning engine operable to correlate location co-ordinates of the resources with co-ordinate information of the spaces, using the map data; and
   a position adaptor operable to provide the location co-ordinates of the resources and the co-ordinate information of the spaces in a format for use with a user interface.

10. A method for enabling the monitoring and navigation of a facility including a plurality of identifiable spaces each associated with one of a plurality of exits, the spaces and exits being linked by a network of pathways, or for determining the position and travel history of tracked resources residing in one of the spaces or moving along the pathways, the method comprising:
    storing digital map data relating to the facility in a map database;
    receiving sensor information from at least one sensor, the sensor information identifying the various resources, spaces, and associated exits;
    developing, using a processor, relational data identifying a relative position of each said resource, space, and exit within said facility, based on the sensor information and the map data; and
    storing said relational data in tables including space-identifying data, tracked-resource data, and exit-identifying data in a location database.

11. The method as in claim 10 further comprising:
    time-stamping the relational data; and
    storing time and position data relating to a tracked resource of the tracked resources, using the time-stamped relational data in a travel history archive.

12. The method as in claim 10 further comprising storing adjacent exit-relational data, point-identifying data, and/or non-adjacent exit-connecting data in the tables.

13. The method as in claim 12 further comprising:
    using said space-identifying data, said tracked-resource data, said exit-identifying data, said adjacent exit-relational data, said point-identifying data, and/or said non-adjacent exit-connecting data to provide services including one or more of identifying and displaying the shortest path between any two of said exits, identifying and displaying the closest tracked resource, providing intrusion alerts for restricted spaces, and/or displaying travel history of tracked resources.

14. The method as in claim 10 wherein the at least one sensor includes a plurality of electromagnetic sensors disposed within the spaces and/or along the connecting paths throughout the facility, the method further comprising identifying a position of a person or object within the facility using the electromagnetic sensors.

15. The method as in claim 10 further comprising:
receiving, from a user, information and services requests; and
displaying outputs generated using the digital map data and the relational data.

16. The method as in claim 15 further comprising:
receiving the information and service requests by voice command; and
audibly providing intrusion alerts.

17. The method as in claim 10 further comprising:
receiving, from a user, information and services requests through a web browser on a computer terminal, the web browser supporting scalable vector graphics.

18. The method as in claim 10 further comprising:
correlating location co-ordinates of the resources with co-ordinate information of the spaces, using the map data; and
providing the location co-ordinates of the resources and the co-ordinate information of the spaces in a format for use with a user interface.

* * * * *

UNITED STATES PATENT AND TRADEMARK OFFICE
CERTIFICATE OF CORRECTION

PATENT NO. : 7,587,274 B2 Page 1 of 1
APPLICATION NO. : 11/375374
DATED : September 8, 2009
INVENTOR(S) : Kaldewey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Twenty-first Day of September, 2010

David J. Kappos
*Director of the United States Patent and Trademark Office*